(12) United States Patent
Chabas et al.

(10) Patent No.: US 9,813,016 B2
(45) Date of Patent: Nov. 7, 2017

(54) PANEL, PANEL ASSEMBLY AND ASSOCIATED ROOFING

(71) Applicant: ARCELORMITTAL

(72) Inventors: Eric Chabas, Villeparisis (FR); David Masure, Boulogne Billancourt (FR); Dominique Ninforge, Forville (BE)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 15/038,840

(22) PCT Filed: Nov. 26, 2014

(86) PCT No.: PCT/IB2014/002572
§ 371 (c)(1),
(2) Date: May 24, 2016

(87) PCT Pub. No.: WO2015/079305
PCT Pub. Date: Jun. 4, 2015

(65) Prior Publication Data
US 2017/0170775 A1    Jun. 15, 2017

(30) Foreign Application Priority Data

Nov. 26, 2013  (WO) .................. PCT/IB2013/002644

(51) Int. Cl.
*H02S 20/25*  (2014.01)
*E04D 3/30*  (2006.01)
(Continued)

(52) U.S. Cl.
CPC ................ *H02S 20/25* (2014.12); *E04D 3/24* (2013.01); *E04D 3/30* (2013.01); *E04C 2/32* (2013.01); *E04C 2/322* (2013.01); *Y02B 10/12* (2013.01)

(58) Field of Classification Search
CPC ..... E04D 3/30; E04D 3/24; E04C 2/32; E04C 2/322; H02S 20/25; Y02B 10/12
See application file for complete search history.

(56) References Cited

U.S. PATENT DOCUMENTS

| 4,962,622 A  * | 10/1990 | Albrecht ............... E04B 5/40 52/220.4 |
| 2004/0231272 A1 * | 11/2004 | Patrick ................. E04B 5/40 52/508 |
| 2009/0308020 A1 | 12/2009 | Duke |

FOREIGN PATENT DOCUMENTS

| AU | GB 1350518 A * | 4/1974 | ............. E04C 2/322 |
| AU | WO 02070831 A1 * | 9/2002 | ............... E04D 3/30 |

(Continued)

*Primary Examiner* — Adriana Figueroa
(74) *Attorney, Agent, or Firm* — Davidson, Davidson & Kappel, LLC; Jennifer L. O'Connell; William C. Gehris

(57) ABSTRACT

A panel has a profile with width L1 comprising a first longitudinal edge comprising in succession a first longitudinal rib comprising a top center part having a height H4 and width L4 and two lateral wings that extend from the top center part on either side and downward, then a first flange having a width L3 oriented in a plane P, the two lateral wings forming an angle α with the plane P, at least one projecting part in the extension of the first flange. An upper plateau having a height H7 and width L7 and two lateral webs extending from the upper plateau on either side and downward, forming an angle β with the plane P, a second longitudinal edge in the extension of one of the projecting parts comprising in succession a second flange having a width L9 oriented in the plane P and a second longitudinal rib comprising a top center part having a height H11 and width L11 and two lateral wings extending from the top center part on either side and downward forming an angle γ with the plane P. The first and second ribs have shapes that allow their respective overlapping, where L7/L4≥5, (Continued)

L7/L11≥5, H7/H4≥0.4, H7≥((H4×(ab−be)−L3×abe)/(ae+ab)), H7≥((H11×(cb−be)−L9×cbe)/(ce+cb)), where a=tan α, b=tan β, c=tan γ and e=tan 20°.

22 Claims, 3 Drawing Sheets

(51) Int. Cl.
    *E04D 3/24*         (2006.01)
    *E04C 2/32*         (2006.01)

(56) References Cited

FOREIGN PATENT DOCUMENTS

| | | | |
|---|---|---|---|
| CH | FR 2964680 A1 * | 3/2012 | ............ F24J 2/5205 |
| CN | 2358138 Y | 1/2000 | |
| CN | 101454521 A | 6/2009 | |
| CN | 202202494 U | 4/2012 | |
| DE | 202011003913 U1 * | 5/2011 | .............. E04D 3/30 |
| EP | 2491197 A2 | 8/2012 | |
| GB | 2195680 A | 4/1988 | |
| WO | 2006/125248 A1 | 11/2006 | |

* cited by examiner

PANEL, PANEL ASSEMBLY AND ASSOCIATED ROOFING

This invention relates to a panel to be used for the construction of building envelopes and intended more particularly to be assembled to make possible the construction of building roofs that support photovoltaic cells, although it is not limited to those applications.

BACKGROUND

It is known that roof coverings can be constructed with structured panels made of pre-painted galvanized steel, for example, the edges of which overlap to ensure the seal of the roof.

It is also known that buildings can be covered with solar modules, specifically photovoltaic modules. These modules can be, among other things, in the form of flexible strips glued to the surface of the troughs of the structured panel. In the future, these may also be photovoltaic devices constructed directly on the surface of the troughs of the structured panel, in particular by vacuum deposition methods. However, an arrangement such as this has the disadvantage that it leaves some of the photovoltaic cells in the shadow of the ribs when the angle of incidence of the sun's rays on the covering is low. This arrangement consequently reduces the performance of the photovoltaic device.

BRIEF SUMMARY

The purpose of this invention is to remedy the problems described above by proposing a structured panel, the profile of which is configured so that the photovoltaic cells cannot be shadowed by the ribs in the great majority of lighting conditions.

For this purpose, a first object of the invention is a panel that has a profile with a width L1 comprising:
- a first longitudinal edge comprising in succession a first longitudinal rib comprising a top center part with a height H4 and width L4 and two lateral wings that extend from the top center part on either side and downward, then a first flange having a width L3 oriented in a plane P, wherein the two lateral wings form an angle $\alpha$ with the plane P,
- at least one projecting part in the extension of the first flange and comprising an upper plateau with a height H7 and width L7 and two lateral webs extending from the upper plateau on either side and downward, forming an angle $\beta$ with the plane P,
- a second longitudinal edge in the extension of one of the projecting parts comprising in succession a second flange having a width L9 located in the plane P and a second longitudinal rib comprising a top center part having a height H11 and width L11 and two lateral wings extending from the top center part on either side and downward, forming an angle $\gamma$ with the plane P, wherein the first longitudinal rib and the second longitudinal rib have shapes that allow them to overlap respectively, the widths L1, L3, L4, L7, L9, L11, the heights H4, H7, H11 and the angles $\alpha$, $\beta$, $\gamma$ respecting the following relationships:

$$L7/L4 \geq 5$$

$$L7/L11 \geq 5$$

$$H7/H4 \geq 0.4$$

$$H7 \geq ((H4 \times (ab-be) - L3 \times abe)/(ae+ab))$$

$$H7 \geq ((H11 \times (cb-be) - L9 \times cbe)/(ce+cb))$$

where a=tan $\alpha$, b=tan $\beta$, c=tan $\gamma$ and e=tan 20°.

The panel according to the invention can also comprise the following optional characteristics, considered individually or in combination:
- the ratio of the sum of the widths L7 of the projecting parts over the width L1 of the panel is greater than or equal to 0.5,
- the relationships are respected with e=tan 15°,
- the ratio H7/H4 is less than or equal to 0.6,
- the widths L4, L7, L11 and the heights H4, H7, H11 respect the following relationships:

$$L7/L4 \geq 5$$

$$L7/L11 \geq 5$$

$$H7 > H4$$

$$H7 > H11$$

- the panel comprises two projecting parts,
- the two projecting parts are separated by two flanges having a length L13 oriented in the plane P framing a central rib comprising a top center part having a height H14 and two lateral wings that extend from the top center part on either side and downward forming an angle $\delta$ with the plane P, the width L13, the heights H7, H14 and the angles $\beta$ and $\delta$ respecting the following relationship:

$$H7 \geq ((H14 \times (db-be) - L13 \times dbe)/(de+db))$$

with d=tan $\delta$,
- the ratio H7/H14 is less than or equal to 0.6,
- the heights H7 and H14 respect the following relationship:

$$H7 > H14$$

- the top center part is plane,
- the upper plateau is arched with a radius of curvature greater than or equal to 1.4 times the width L7 of the upper plateau,
- the upper plateau is concave,
- the upper plateau is convex,
- the lateral web of the projecting part comprises a Z-shaped stiffener in the upper part of the web,
- the upper plateau comprises a longitudinal groove designed to allow the passage of cables,
- the panel comprises a stamped depression in the surface of the upper plateau designed to house an electrical junction box,
- the angles $\alpha$, $\beta$ and $\gamma$ are acute,
- the angles $\alpha$ and $\gamma$ are acute and the angle $\beta$ is obtuse,
- the upper plateau is covered with photovoltaic cells,
- the photovoltaic cells are assembled in the form of flexible strips glued to the upper plateau,
- the photovoltaic cells are fabricated directly on the upper plateau by vacuum deposition processes.

The present invention may also provide a roof comprising an assembly by marginal overlap of at least two panels according to the invention.

Other characteristics and advantages of the invention will become apparent from a reading of the following description.

BRIEF DESCRIPTION OF THE DRAWINGS

The invention will be understood in greater detail from a reading of the following description, which is given by way of non-restricting examples, with reference to the accompanying figures, in which.

The same reference numbers represent the same elements in each of the figures.

DETAILED DESCRIPTION

Throughout the text, the term "panel" means an element with a flat shape, i.e. with a low thickness compared to its other dimensions. The panel can be in the form of a plate or a sheet made of a single material or a composite assembly. In the latter case, the panel is a stack of a plurality of layers of the same material or different materials. The material in question can be, among other things, a metal, polymer or even a ceramic material. By way of non-restricting examples, mention can be made of the metal materials steel, aluminum, copper and zinc. The panel is preferably a metal sheet. It is preferably galvanized steel that is pre-painted to protect it against corrosion. The panel can optionally be foamed.

In the framework of the invention, the panel will have previously been shaped by means of any known shaping process including, by way of non-restricting examples, bending, forming, stamping and molding.

This shaping process results among other things in the formation of ribs on the surface of the panel. In the present context, "rib" is understood to mean a protrusion formed on the surface of the panel. The rib can have a trapezoidal shape, as in the case of the exemplary embodiments described below, or it can have a rectangular, corrugated, sinusoidal shape or can even be in the shape of an omega, for example. It comprises a top center part and two lateral wings.

To form a roof or a facade, the panels are assembled by overlapping their longitudinal edges and their transverse edges and are attached to the load-bearing structure of the building by fastening means such as screws, nails or even rivets.

Figure 1:
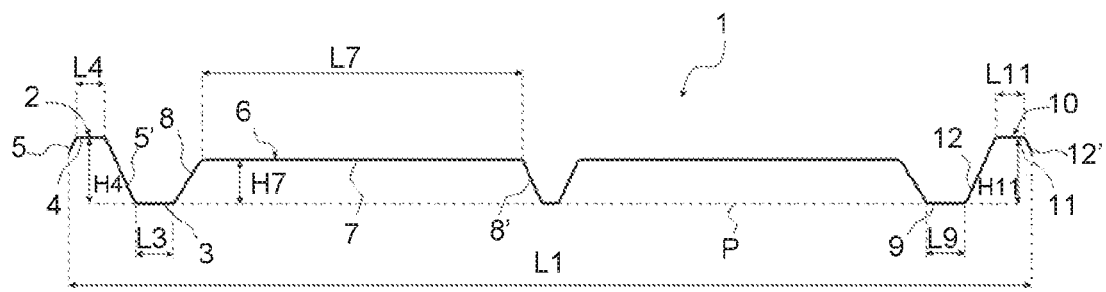
FIG. 1 is a cross section of a panel according to the invention.

With reference to FIG. 1, the panel 1, shown here in cross section, is constituted principally by a first longitudinal edge, a projecting part designed to be covered by photovoltaic cells, and a second longitudinal edge.

First, a first longitudinal edge of the panel 1 comprises in succession a first longitudinal rib 2 and a first flange 3 having a width L3 oriented in a plane P. The rib 2 is constituted by a top center part 4 having a height H4 and width L4 and two lateral wings 5, 5' that extend from the central part 4 on either side and downward, forming an angle α with the plane P. "Height H4" as used here means the distance between the plane P and the highest point of the top center part.

The longitudinal rib has, among other things, the function of providing the fastening of the panel to the structure of the building in the upper part of the profile of the panel and not in the lower part. This arrangement makes it possible to prevent water from accumulating in the vicinity of the fastening points and therefore to prevent potential leaks in the roof.

In the case of this example, the top center part 4 is plane and the lateral wings 5, 5' are inclined, extending downward and toward the outside of the top center part 4, the angle α then being acute. In the framework of the invention, the longitudinal rib 2 may of course have shapes other than the one described in the case of this example. The lateral wing 5' of the longitudinal rib 2 may among other things be truncated, as in the case illustrated in FIG. 1, or not, as a function of the desired mechanical strength of this part of the panel.

The panel 1 comprises a second longitudinal edge comprising a second flange 9 having a width L9 oriented in the plane P and a second longitudinal rib 10 comprising a top center part 11 having a height H11 and width L11 and two lateral wings 12, 12' that extend from the top center part on either side and downward, forming an angle γ with the plane P.

The function of the second longitudinal rib is to be covered by the first longitudinal rib of the adjacent panel when two panels are assembled. Consequently, the height H11 is less than or equal to the height H4 of the first longitudinal rib. The shapes of the first and second longitudinal rubs are adjusted as appropriate. Preferably, the shapes are adjusted to ensure water-tightness if the panel is used in roofing. Preferably, the two ribs have identical shapes and dimensions so that the overlap is completely contiguous and therefore completely watertight. However, in the framework of the invention, the overlap may be contiguous only locally. A person skilled in the art who is familiar with these sealing issues will know how to adapt the shapes of the two longitudinal ribs as a function of the desired aesthetic appearance while ensuring the sealing of the assembly.

In the extension of the first flange 3 there is at least one projecting part 6 that comprises an upper plateau 7 having a height H7 and width L7 and two lateral webs 8, 8' that extend from the upper plateau on either side and downward forming an angle β with the plane P. "Height H7" in this case means the distance between the plane P and the lateral extremity of the upper plateau, in other words the point of intersection of the upper plateau and a lateral web.

The plateau 7 is designed to be covered with photovoltaic cells. For example, they can be modules in the form of flexible strips glued to the surface of the upper plateau 7 or photovoltaic devices constructed directly on the surface of the plateau 7 using vacuum or atmospheric pressure deposition processes. For this purpose, and to obtain a significant rate of photovoltaic coverage, the plateau 7 is relatively large compared to the top center part 4, 11 of the longitudinal ribs and occupies a significant part of the panel. Therefore, in the framework of the invention:

the ratio of the width L7 of the upper plateau 7 to the width L4 of the top center part 4 is greater than or equal to 5, the ratio of the width L7 of the upper plateau 7 to the width L11 of the top center part 11 is greater than or equal to 5.

Preferably, and still for the purpose of obtaining a panel largely covered with photovoltaic cells, the ratio of the sum of the widths L7 of the projecting parts 6, 6' over the width L1 of the panel is greater than or equal to 0.5.

Figure 2:
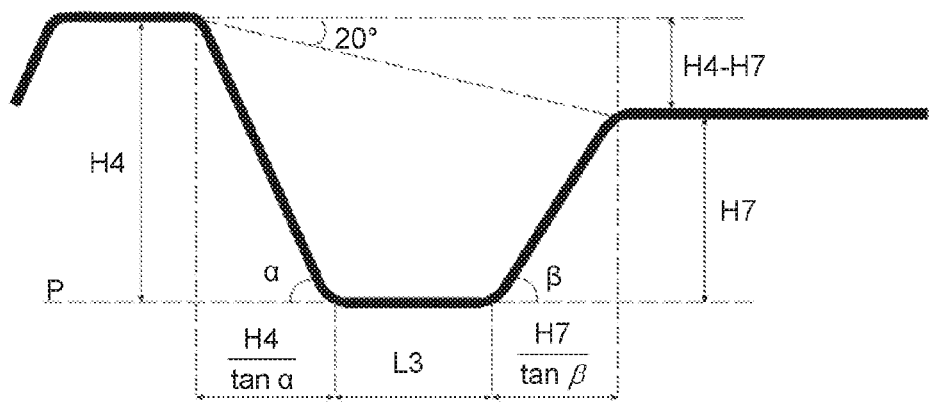
FIG. 2 is a detail of FIG. 1.

In addition, the height of the upper plateau, the height of the top center parts, the width of the flanges and the angles α, β and γ are configured so that no portion of the photovoltaic cells covering the upper plateau may be in the shadow of the first and second longitudinal ribs when the rays of the sun form an angle with this plane P greater than or equal to 20°. For this purpose, in the framework of the invention:

$$H7/H4 \geq 0.4 \qquad (1)$$

$$H7 \geq ((H4 \times (ab-be) - L3 \times abe)/(ae+ab)) \qquad (2)$$

and $$H7 \geq ((H11 \times (cb-be) - L9 \times cbe)/(ce+cb)) \qquad (3)$$

where $a = \tan \alpha$, $b = \tan \beta$, $c = \tan \gamma$ and $e = \tan 20°$ wherein the inequations (2) and (3) result from the expression of the tangent of the angle of 20° as illustrated in FIG. 2.

The 20° angle corresponds to the acceptable limit in terms of energy losses due to shade; these losses represent in that case only a small percentage of the energy received by the photovoltaic cells.

For a ratio H7/H4 less than 0.4, respect for the inequations (2) and (3) requires recourse to very wide flanges 3 and 9, which is relatively incompatible with the objective of obtaining a panel largely covered with photovoltaic cells.

In one variant, the ratio H7/H4 is less than or equal to 0.6 so that the majority of the upper plateau does not go above the top center part of the rib even when the upper plateau is curved, as described below. The roof seal is thus better preserved because the water that runs off the upper plateau cannot reach the longitudinal edges of the panel, at the level of the overlapping edges between two panels.

Preferably, the inequations (2) and (3) are satisfied for $e = \tan 15°$, and even more preferably for $e = \tan 10°$ C. Therefore the photovoltaic cells that cover the upper plateau are not in the shadow of the first and second longitudinal ribs when the rays of the sun are at a particularly low angle.

Even more preferably, the photovoltaic cells covering the upper plateau are never in the shadow of the first and second longitudinal ribs regardless of the incidence of the rays of the sun. This condition is satisfied when the height H7 of the upper plateau 7 is greater than or equal to the height H4 of the top center part 4 and is greater than or equal to the height H11 of the top center part 11. In other words, this condition is satisfied when the inequations (1) to (3) are replaced by the following inequations:

$$H7 \geq H4 \qquad (4)$$

and $$H7 \geq H11 \qquad (5)$$

Even more preferably, the height H7 of the upper plateau 7 is strictly greater than the height H4 of the top center part 4 and is strictly greater than the height H11 of the top center part 11. In other words, this condition is satisfied when the inequations (1) to (3) are replaced by the following inequations:

$$H7 > H4 \qquad (6)$$

and $$H7 \geq H11 \qquad (7)$$

Therefore, not only are the photovoltaic cells covering the upper plateau never in the shadow of the first and second longitudinal ribs, whatever the angle of incidence of the rays of the sun, but a configuration of this type makes it possible to consider the addition of photovoltaic cells in the upper part of the lateral webs 8, 8' of the projecting part 6, in other words in the part of the lateral webs that are never in the shadow of the longitudinal ribs. This makes it possible to increase the rate of photovoltaic coverage of the panel. In addition, the cleaning of the photovoltaic cells is facilitated because the longitudinal ribs do not pose an obstacle between the photovoltaic cells of two adjacent plateaus.

Preferably, and still with the objective of preventing cast shadows on the photovoltaic cells, the plateau is plane and horizontal as illustrated in FIG. 1. It is thereby ensured that no portion of the plateau will cast a shadow on another portion of the plateau. Nevertheless, in the framework of the invention, the plateau can also be only approximately plane, in other words it can be slightly concave or slightly convex. "Slightly concave" and "slightly convex" in this case means that the curvature of the plateau is such that no portion of the plateau casts a shadow on any other portion of the plateau when the rays of the sun strike it at an angle greater than or equal to 20° with the plane P. That corresponds to a curvature radius of the plateau greater than or equal to 1.4 times the width L7 of the upper plateau, i.e., for example, a curvature radius of 400 mm for a width L7 on the order of 275 mm. This curvature of the plateau makes it possible to increase the mechanical strength of the projecting part. The upper plateau is stiffened and therefore does not sag if a load is applied.

The upper plateau 7 can also comprise one or more longitudinal grooves oriented downward and designed to allow the passage of cables on the underside of the photovoltaic cells. These grooves can optionally be combined with one or more stamped depressions in the surface of the upper plateau designed to house, between the plateau and the photovoltaic cells, the electrical junction box of the photovoltaic module.

The orientation of the lateral wings 8, 8' can also make it possible to increase the rate of photovoltaic coverage. In the case illustrated in FIG. 1, the lateral wings 8, 8' are inclined, extending downward and toward the outside of the upper plateau 7. However, other configurations are also possible; the lateral wings 8, 8' can for example extend downward and toward the interior of the upper plateau 7, wherein the angle β is obtuse, to minimize the distance between the longitudinal extremity of the upper plateau 7 and the longitudinal extremity of the top center part 4 and thereby maximize the surface area available for the photovoltaic cells.

A first exemplary embodiment of the invention is described with reference to FIG. 3.

The panel 1 in this case comprises a first longitudinal edge, two successive projecting parts 6, 6' and a second longitudinal edge.

The two longitudinal ribs 2, 10 have an identical trapezoidal shape, wherein the lateral wings extend downward and toward the outside and the lateral wings 5, 12' are truncated. The overlapping of the two longitudinal ribs is therefore completely contiguous, which contributes to the seal of the roof.

The projecting parts have slightly concave upper plateaus with a radius of curvature of the plateau approximately equal to 1.8 times the width L7 of the upper plateau.

The height H7 of the upper plateaus is greater than the height H4 of the upper central parts, which prevents any shadows being cast by the longitudinal ribs on the plateaus.

The two projecting parts 6, 6' are separated by two flanges 13, 13' having a length L13 and oriented in the plane P framing a central rib comprising a top center part 14 having a height H14 and two lateral wings 15, 15' that extend from the top center part on either side downward and toward the outside forming an angle δ with the plane P. This central rib makes it possible on the one hand to increase the mechanical strength of the panel and on the other hand to fasten the center of the panel to the load-bearing structure of the building, whereby the flanges 13, 13' constitute support points of the panel on the structure. The flanges and the central rib are configured so that the photovoltaic cells that cover the upper plateau cannot be in the shadow of the central rib when the rays of the sun are at an angle greater than or equal to 20° with the plane P. For this purpose, the width L13, the heights H7, H14 and the angles β and δ respect the following relationship:

$$H7 \geq ((H14 \times (db-be) - L13 \times dbe)/(de+db)) \quad (6)$$

with b=tan β, d=tan δ and e=tan 20°

In one variant, the ratio H7/H14 is greater than 0.4, which eliminates the need to use flanges 13 that are excessively wide.

In one variant, the ratio H7/H14 is less than or equal to 0.6 so that the majority of the upper plateau does not extend above the top center part of the rib even when the upper plateau is curved. This arrangement more effectively preserves the seal of the roof, because the water that runs down the upper plateau cannot reach the top center part 14 where the fastening means of the panel to the load-bearing structure of the building are located.

Preferably, the inequation (6) is satisfied for e=tan 15°, and even more preferably for e=tan 10°. The photovoltaic cells that cover the upper plateau are therefore not in the shadow of the central rib when the rays of the sun are at a particularly low angle.

Even more preferably, the photovoltaic cells that cover the upper plateau are never in the shadow of the central rib, regardless of the angle of incidence of the rays of the sun. This condition is satisfied when the inequation (6) is expressed as follows:

$$H7 \geq H14$$

Even more preferably, the height H7 of the upper plateau 7 is strictly greater than the height H14 of the top center part 14. Therefore, not only are the photovoltaic cells covering the upper plateau never in the shadow of the central rib regardless of the incidence of the rays of the sun, but a configuration of this type makes it possible to consider the addition of photovoltaic cells in the upper part of the lateral webs 8, 8' of the projecting part 6, in other words in the part of the lateral webs that are never in the shadow of the central rib. This makes it possible to increase the rate of photovoltaic coverage of the panel. In addition, the cleaning of the photovoltaic cells is facilitated because the central rib does not pose an obstacle between the photovoltaic cells of two adjacent plateaus.

In the case of this example, the top center part 14 of the central rib is of the same height as the top center part 4 of the first longitudinal rib.

A second embodiment of the invention is described with reference to FIG. 4.

Figure 3:
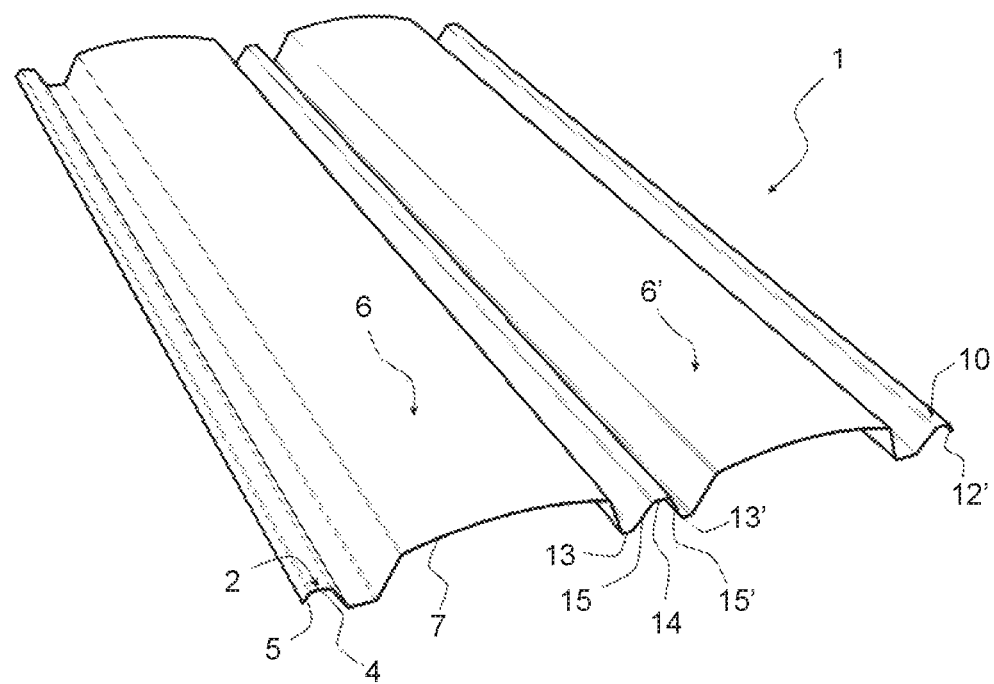
FIG. 3 is a view in perspective of a panel according to a first embodiment of the invention.
Figure 4:
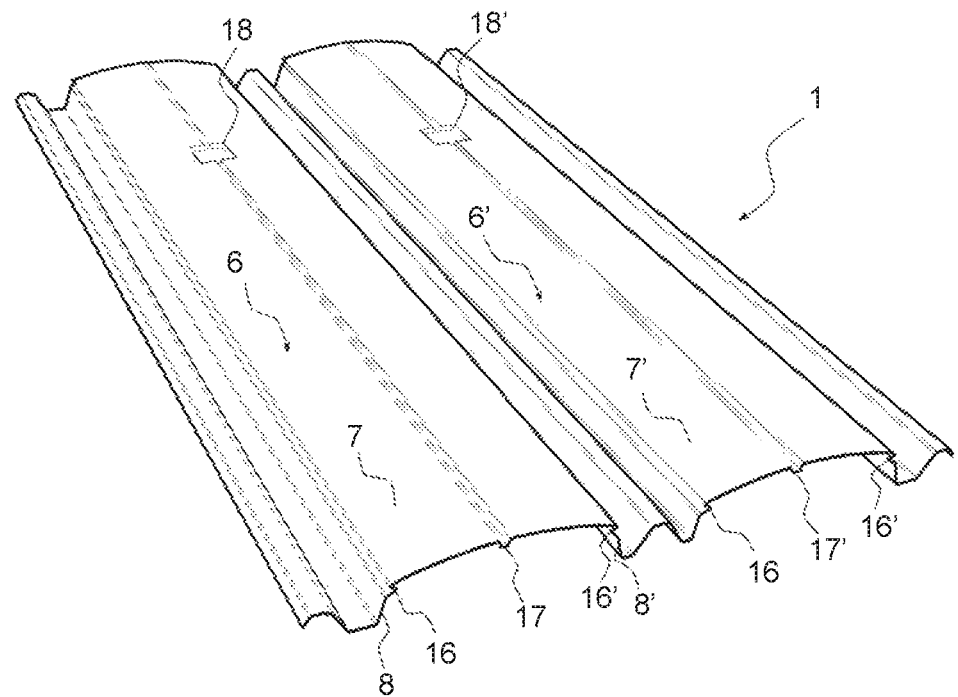
FIG. 4 is a view in perspective of a panel according to a second embodiment of the invention.

Panel 1 in FIG. 4 repeats the characteristics of the first embodiment illustrated in FIG. 3. To these are added the characteristics described below.

The lateral webs 8, 8' of the projecting parts 6, 6' comprise a Z-shaped stiffener 16, 16' in the top portion of the web in the vicinity of the upper plateau. This stiffener makes it possible on one hand to reinforce the mechanical strength of the protecting part and on the other hand to ensure the fastening of photovoltaic modules by clipping their longitudinal extremities on the stiffeners 16, 16'.

The upper plateaus 7, 7' also comprise a cable passage 17, 17' in the form of a longitudinal groove, oriented downward, located approximately in the center of the upper plateau and designed to facilitate the passage of the cables on the underside of the photovoltaic cells. This cable passage is supplemented by a stamped depression 18, 18' in the surface of the upper plateau designed to hold the electrical junction box of the photovoltaic module between the plateau and the photovoltaic cells.

Figure 5:
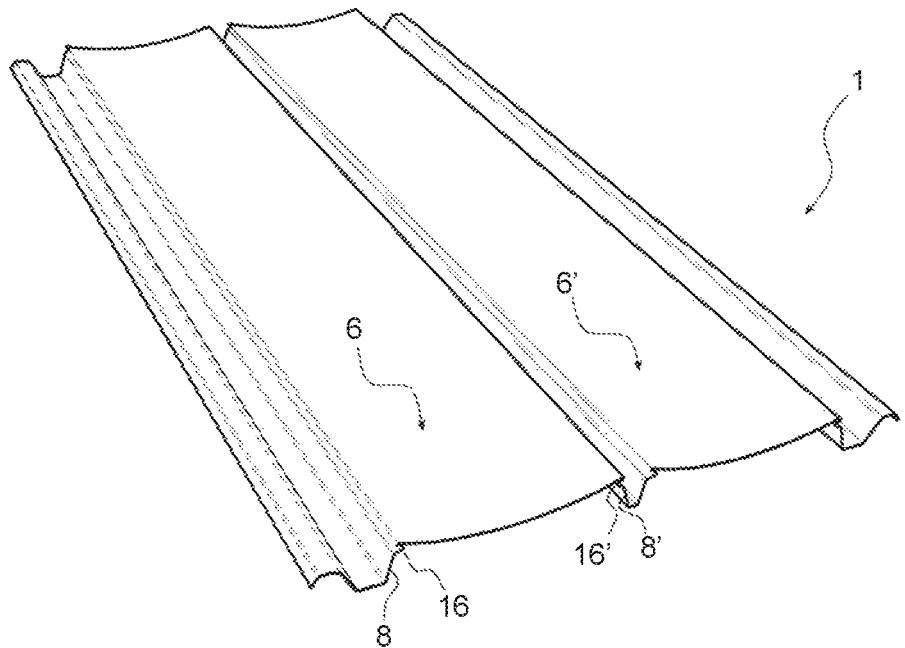
FIG. 5 is a view in perspective of a panel according to a third embodiment of the invention.

A third embodiment of the invention is described with reference to FIG. 5.

The panel 1 in this case comprises a first longitudinal edge, two successive projecting parts 6, 6' and a second longitudinal edge.

The two longitudinal edges repeat the characteristics of those of the first embodiment illustrated in FIG. 3.

The two projecting parts 6, 6' are separated by a flange. Each of them has a slightly convex upper plateau with a radius of curvature of the plateau equal to approximately 1.8 times the width L7 of the upper plateau. This slight convexity facilitates the runoff of rainwater.

The lateral webs 8, 8' of the projecting parts 6, 6' comprise a stiffener 16, 16' as illustrated in FIG. 4.

The height H7 of the upper plateaus is greater than the height H4 of the top center parts, which prevents the longitudinal ribs from casting any shadow on the plateaus.

It goes without saying that the characteristics described with reference to the preferred embodiments are independent of one another, and consequently that other combinations of these characteristics, that is to say, other panel profiles, are possible.

The invention claimed is:

1. A panel having a profile with a width L1, comprising:
a first longitudinal edge including a first longitudinal rib including a top center part having a height H4 and width L4 and two lateral wings that extend from the top center part on either side and downward, the first longitudinal edge adjacent a first flange having a width L3 oriented in a plane P, wherein the two lateral wings form an angle α with the plane P, and adjacent the first flange, at least one projecting part including an upper plateau having a height H7 and width L7 and two lateral webs extending from the upper plateau on either side and downward, forming an angle β with the plane P; and
a second longitudinal edge adjacent the at least one projecting part including a second flange having a width L9 oriented in the plane P adjacent a second longitudinal rib including a top center part having a height H11 and width L11 and two lateral wings extending from the top center part on either side and downward forming an angle γ with the plane P, the first longitudinal rib and the second longitudinal rib having shapes that allow their respective overlapping,
wherein the widths L1, L3, L4, L7, L9, L11, the heights H4, H7, H11 and the angles α, β, γ meet the following relationships:

$$L7/L4 \geq 5$$

$$L7/L11 \geq 5$$

$$H7/H4 \geq 0.4$$

$$H7 \geq ((H4 \times (ab-be) - L3 \times abe)/(ae+ab))$$

$$H7 \geq ((H11 \times (cb-be) - L9 \times cbe)/(ce+cb))$$

where a=tan α, b=tan β, c=tan γ and e=tan 20°.

2. The panel according to claim 1, wherein a ratio of the sum of the width L7 of the projecting parts over the width LI of the panel is greater than or equal to 0.5.

3. The panel according to claim 1 wherein the relationships are met with e=tan 15°.

4. The panel according to claim 1 wherein the ratio H7/H4 is less than or equal to 0.6.

5. The panel according to claims 1 wherein the widths L4, L7, L11 and the heights H4, H7, H11 respect the following relationships:

$$L7/L4>5$$

$$L7/L11>5$$

$$H7>H4$$

$$H7>H11.$$

6. The panel according to claim 1, wherein the at least one projecting part comprises two projecting parts.

7. The panel according to claim 6, wherein the two projecting parts are separated by two flanges, each of the two flanges having a length L13 oriented in the plane P framing a central rib comprising a top center part having a height H14 and two lateral wings extending from the top center part on either side and downward, forming an angle α with the plane P, the width L13, the heights H7, H14 and the angles β and α meet the following relationship:

$$H7>((H14\times(db-be)-L13\times dbe)/(de+db))$$

where d=tan α.

8. The panel according to claim 7 wherein the ratio H7/H14 is less than or equal to 0.6.

9. The panel according to claim 7 wherein the heights H7 and H14 meet the following relationship: H7>H14.

10. The panel according to claim 1 wherein the top center part is planar.

11. The panel according to claim 1, wherein the upper plateau is curved with a curvature radius greater than or equal to 1.4 times the width L7 of the upper plateau.

12. The panel according to claim 4 wherein the upper plateau is concave.

13. The panel according to claim 4 wherein the upper plateau is convex.

14. The panel according to claim 1, wherein the lateral webs of the at least one projecting part comprises a Z-shaped stiffener in the upper part of the webs.

15. The panel according to claim 1, wherein the upper plateau comprises a longitudinal groove designed to allow the passage of cables.

16. The panel according to claim 1, further comprising a stamped depression in a surface of the upper plateau designed to house an electrical junction box.

17. The panel according to claim 1, wherein the angles α, β and γ are acute.

18. The panel according to claim 1, wherein the angles α and γ are acute and the angle β is obtuse.

19. The panel according to claim 1, further comprising photovoltaic cells, wherein the upper plateau is covered with the photovoltaic cells.

20. The panel according to claim 12 wherein the photovoltaic cells are comprised of flexible strips glued to the upper plateau.

21. The panel according to claim 12, wherein the photovoltaic cells are formed directly on the upper plateau by vacuum deposition methods.

22. Roofing comprising an assembly by marginal overlap of at least two panels according to claim 1.

* * * * *